United States Patent
Mashimo et al.

(10) Patent No.: US 7,697,405 B2
(45) Date of Patent: Apr. 13, 2010

(54) INSPECTION APPARATUS FOR OPTICAL DISK HAVING PHASE MODULATED WOBBLE TRACKS AND OPTICAL DISK APPARATUS FOR DRIVING THE OPTICAL DISK

(75) Inventors: Akira Mashimo, Tokorozawa (JP); Keishi Ueno, Iruma (JP)

(73) Assignee: TEAC Coporation, Tama-shi (JP)

( * ) Notice: Subject to any disclaimer, the term of this patent is extended or adjusted under 35 U.S.C. 154(b) by 1204 days.

(21) Appl. No.: 11/259,852

(22) Filed: Oct. 26, 2005

(65) Prior Publication Data

US 2006/0092791 A1    May 4, 2006

(30) Foreign Application Priority Data

Oct. 28, 2004    (JP) .............................. 2004-314641

(51) Int. Cl.
*G11B 7/24* (2006.01)
(52) U.S. Cl. ................... 369/275.1; 369/275.3
(58) Field of Classification Search .............. 369/47.48, 369/47.27
See application file for complete search history.

(56) References Cited

U.S. PATENT DOCUMENTS

| 5,999,504 | A | 12/1999 | Aoki | |
|---|---|---|---|---|
| 6,298,021 | B2 * | 10/2001 | Aoki | 369/47.1 |
| 6,345,018 | B1 * | 2/2002 | Maegawa et al. | 369/44.13 |
| 6,525,523 | B1 * | 2/2003 | Soma et al. | 324/76.77 |
| 7,002,895 | B1 * | 2/2006 | Taussig | 369/275.1 |
| 2004/0190415 | A1 * | 9/2004 | Nagai et al. | 369/53.11 |
| 2004/0240344 | A1 | 12/2004 | Ogawa et al. | |

FOREIGN PATENT DOCUMENTS

| JP | 10-69646 | 3/1998 |
|---|---|---|
| JP | 2004-280878 A | 10/2004 |
| TW | 589632 | 6/2004 |
| WO | WO 03/028012 A1 | 3/2003 |

OTHER PUBLICATIONS

Rakeshi Bhatia, Frequently Asked Questions on DDR applications, Pericom, Jan. 22, 2001.*

(Continued)

*Primary Examiner*—Joseph H Feild
*Assistant Examiner*—Tawfik Goma
(74) *Attorney, Agent, or Firm*—Christensen O'Connor Johnson Kindness PLLC

(57) ABSTRACT

An inspection apparatus for inspecting a phase modulated wobble track of an optical disk is provided. A radial push-pull signal (a wobble signal) of an optical disk is supplied to a low pass filter where a phase boundary portion of the wobble signal is smoothed, and then binarized by a binarizer and supplied to a time interval analyzer. The time interval analyzer analyzes a period of the binary wobble signal to extract two peak values T1 and T2 thereof. An operation device computes a difference value of the two periods T1 and T2 and a standard deviation of each peak, and compares each computed value to a threshold value for simultaneously evaluating CNR and a phase shift. The low pass filter and the binarizer may be incorporated into an optical disk apparatus for smoothing the phase boundary portion of the reproduced wobble signal.

8 Claims, 7 Drawing Sheets

OTHER PUBLICATIONS

Ronen Cohen, Jitter and Signal Noise in Frequency Sources, Raltron Electronics Corp., Jan. 15, 2005.*

Measuring Jitter in Digital Systems, Agilent Technologies, Jan. 30, 2008.*

Random and Deterministic Jitter, EDN (Electronics Design Strategy News) Magazine, Jun. 27, 2002.*

Notice of Grounds for Rejection dated Sep. 4, 2007, issued in corresponding Japanese Application No. 2004-314641, filed Oct. 28, 2004.

* cited by examiner

INSPECTION APPARATUS FOR OPTICAL DISK HAVING PHASE MODULATED WOBBLE TRACKS AND OPTICAL DISK APPARATUS FOR DRIVING THE OPTICAL DISK

BACKGROUND OF THE INVENTION

1. Field of the Invention

The present invention relates to technology for inspecting an optical disk having a wobble track which has been phase-modulated, and to technology for reproducing data recorded on an optical disk.

2. Description of Related Art

Conventionally, a technique for inspecting an optical disk having wobble tracks which are wobbled in accordance with a frequency which is phase-modulated, such as DVD+R and DVD+RW, to determine whether or not the wobble tracks are formed correctly, has been proposed.

Japanese Patent Laid-Open Publication No. 2004-280878 discloses that a light beam is irradiated onto a wobble track and a wobble signal obtained from light reflected from the wobble track is doubled, whereby the quality of the wobble track is evaluated based on the frequency characteristics of the doubled signal.

FIG. 7 is a block diagram showing the structure of an evaluation device described in the above-described publication. Referring to FIG. 7, a PUH 40 irradiates a light beam onto a wobble track of an optical disk D1. A PD 50 detects light reflected from the wobble track. A radial push-pull signal which is generated from a signal detected by the PD 50, namely a wobble signal, is input to a frequency characteristics measuring section 100.

FIG. 8 is a block diagram showing the structure of the frequency characteristics measuring section 100 in FIG. 7. A low noise eliminator/amplifier 101 eliminates a direct-current component contained in the wobble signal and appropriately amplifies the wobble signal. A band pass filter 102 eliminates excessive frequency components contained in the wobble signal which is supplied thereto. Here, the excessive frequency components refer to frequency components which are sufficiently far from the carrier frequency. A multiplication circuit 103 multiplies the supplied wobble signal to generate a doubled wobble signal. A frequency characteristics measuring circuit 104 measures a doubled NBSNR (Narrow-Band Signal-to-Noise Ratio) (or CNR (Carrier Noise Ratio) to determine whether or not the evaluation result of the doubled wobble signal satisfies a predetermined evaluation target. If a difference between a peak level obtained from the frequency characteristics of the doubled wobble signal and a noise level (i.e. a doubled NBSNR or CNR) is 17 dB or greater, it is determined that the quality of the wobble track is acceptable.

As described above, it is possible to evaluate the frequency characteristics of a doubled wobble signal to thereby evaluate the quality of a wobble track. In phase-modulated wobble tracks, however, evaluation as to whether or not phases are correctly shifted by 180 degrees with respect to each other, in addition to evaluation of the NBSNR (or CNR; hereinafter collectively referred to as CNR) is also required. It is therefore difficult to evaluate a phase shift only by the measurement of CNR of a doubled wobble signal using a spectrum analyzer.

SUMMARY OF THE INVENTION

The present invention provides a method, an apparatus, and an optical disk, in which, in addition to frequency characteristics (CNR) of a wobble track which has been phase-modulated, phase characteristics (a phase shift) of the wobble track can also be evaluated, thereby allowing evaluation of the quality of the wobble track at a higher precision, or an optical disk apparatus with high performance address reading.

In accordance with one aspect of the present invention, there is provided an inspection apparatus for an optical disk having a wobble track wobbled in accordance with a frequency which is phase modulated with two phases, the inspection apparatus comprising a binarizer for binarizing a wobble signal corresponding to the wobble track; a time interval analyzer for analyzing a period included in a binary wobble signal; a computation device which extracts a first peak period T1 and a second peak period T2 (T1<T2) from an analysis result obtained by the time interval analyzer for computing a difference value between twice the first peak period T1 and the second peak period T2 and computing peak widths of the first peak period T1 and the second peak period T2; and an evaluation device for evaluating a quality of the wobble track in accordance with the difference value and the peak widths.

In the present invention, the difference value represents an amount of a phase shift of a wobble signal which is phase modulated with two phases (i.e. an amount of shift from 180° when the two phases are shifted from each other by 180°), and the peak width represents CNR. According to the present invention, these values are evaluated, whereby not only the CNR but also the phase shift can be evaluated simultaneously for inspecting the quality of the wobble track.

In an embodiment of the present invention, the computation device computes an evaluation parameter E=(2T1−T2)/2T1 and also calculates, as the peak width, a standard deviation obtained when taking distributions of the first peak period and the second peak period as a normal distribution, and the evaluation device compares the evaluation parameter E and the standard deviation with respective threshold values for evaluation.

Further, the present invention provides a method of inspecting an optical disk having a wobble track wobbled in accordance with a frequency which is phase modulated with two phases which are shifted from each other by 180 degrees, the method comprising the steps of irradiating a light beam to the wobble track and reproducing a wobble signal corresponding to the wobble track from light reflected from the wobble track; eliminating, using a low pass filter, a high frequency component existing at a boundary portion of the phase modulation, from the wobble signal which is reproduced; binarizing the wobble signal which has passed through the low pass filter; analyzing a period included in a binary wobble signal by a time interval analyzer; extracting two peak periods from an analysis result obtained by the time interval analyzer and computing a shift amount of the two peak periods from a predetermined relationship and peak widths of the two peak periods; and comparing the shift amount with a first threshold value for evaluating a phase shift of the wobble track and comparing the peak widths with a second threshold value for evaluating CNR of the wobble signal. The above inspection method can be executed by a computer in which an inspection program is installed. The inspection program can be recorded in a computer readable recording medium.

According to the present invention, the quality of a wobble track formed on an optical disk can be evaluated, and more particularly the CNR and the phase shift can be evaluated simultaneously, thereby allowing highly precise inspection as to whether a wobble track is normal or defective. Further, according to the present invention, it is possible to provide an optical disk on which a wobble track is formed at high precision for allowing high quality data recording and reproducing.

The present invention is also applicable to an optical disk apparatus (an optical disk drive) which performs data recording and reproducing with respect to an optical disk. Such an optical disk apparatus may include a section for reproducing a wobble signal from an optical disk, a low-pass filter for eliminating a high frequency component at a phase boundary portion of a reproduced wobble signal, and a binarizer for binarizing an output from the low-pass filter.

BRIEF DESCRIPTION OF THE DRAWINGS

A preferred embodiment of the present invention will be described in detail based on the following figures, wherein.

DETAILED DESCRIPTION OF PREFERRED EMBODIMENT

A preferred embodiment of the present invention will be described in detail with reference to the accompanying drawings.

Figure 7:
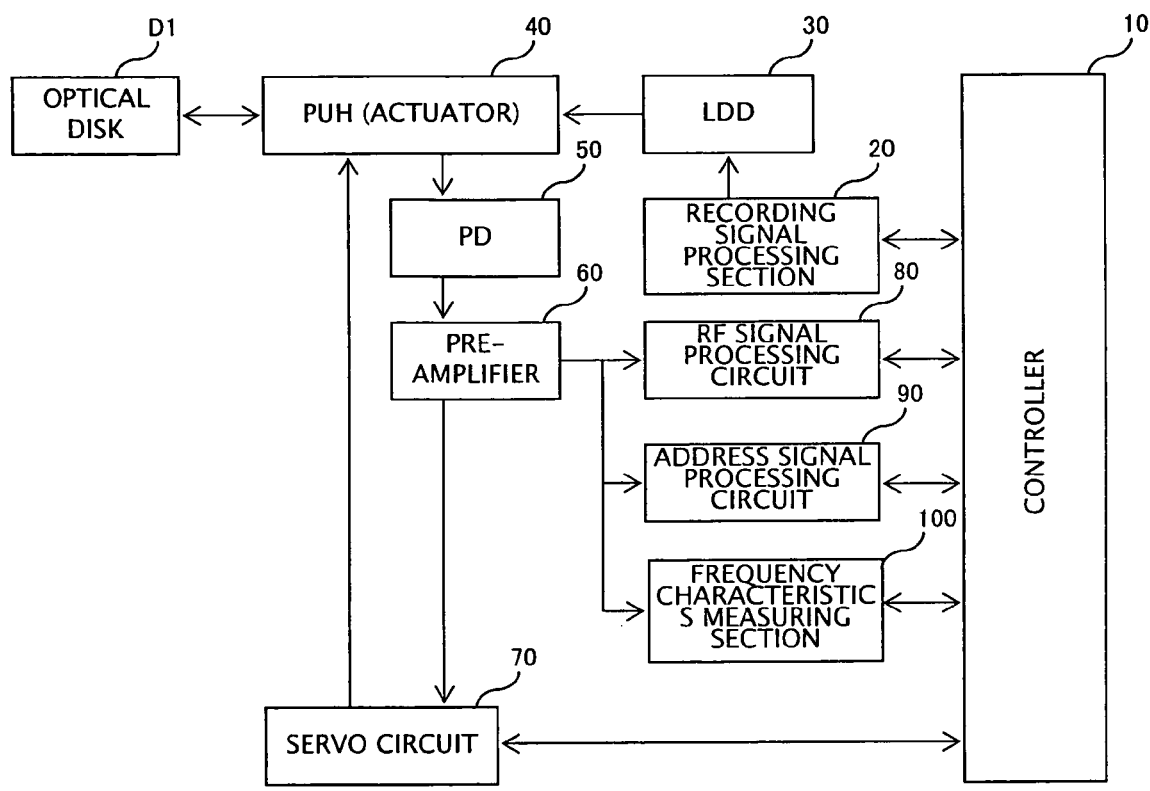
FIG. 7 is a block diagram showing an overall structure of a conventional apparatus.
Figure 8:
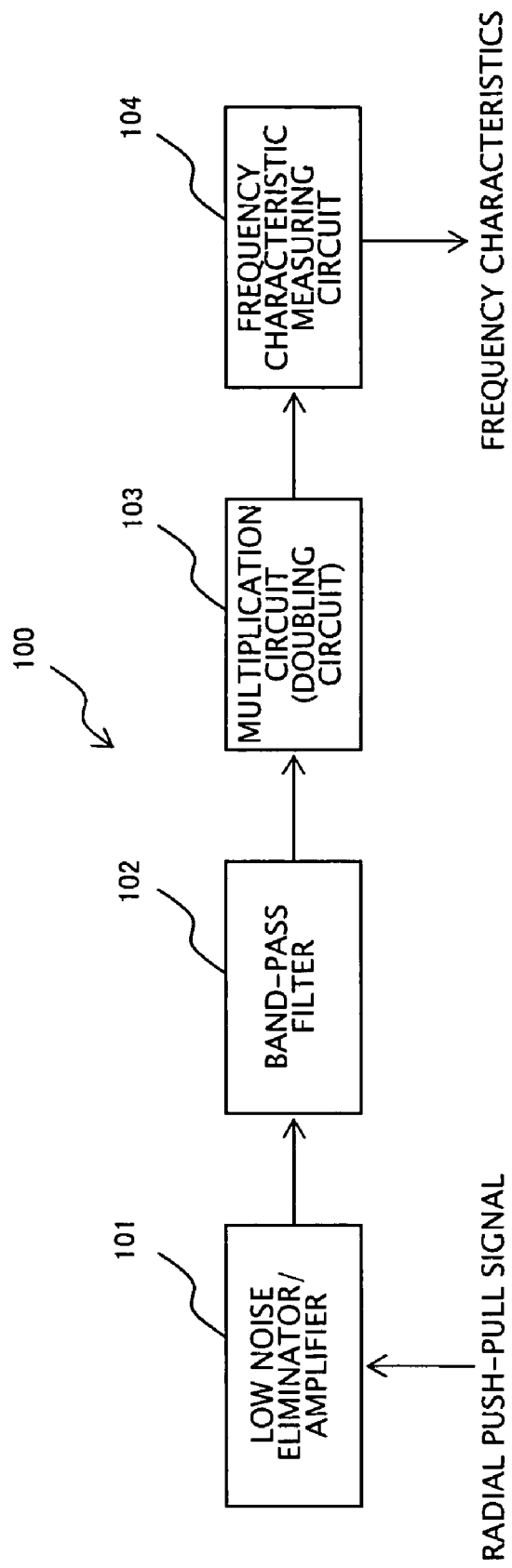
FIG. 8 is a block diagram showing the structure of the frequency characteristics measuring section of FIG. 7.

An overall structure of an optical disk inspection apparatus according to the present embodiment is substantially the same as that of a conventional apparatus shown in FIG. 7. More specifically, laser light is irradiated onto the optical disk D1 having a wobble track which has been subjected to BPSK (Binary Phase Shift Keying) modulation, such as DVD+R and DVD+RW. The light reflected from the optical disk D1 is received by the PD 50 and is converted into an electrical signal. After amplification of the electrical signal by the pre-amplifier 60, a radial push-pull signal is extracted as a wobble signal. While the wobble signal is then supplied to the frequency characteristics measuring section 100 in the structure shown in FIG. 7, the wobble signal is supplied to a characteristics measuring section 200 in the present embodiment.

Figure 1:
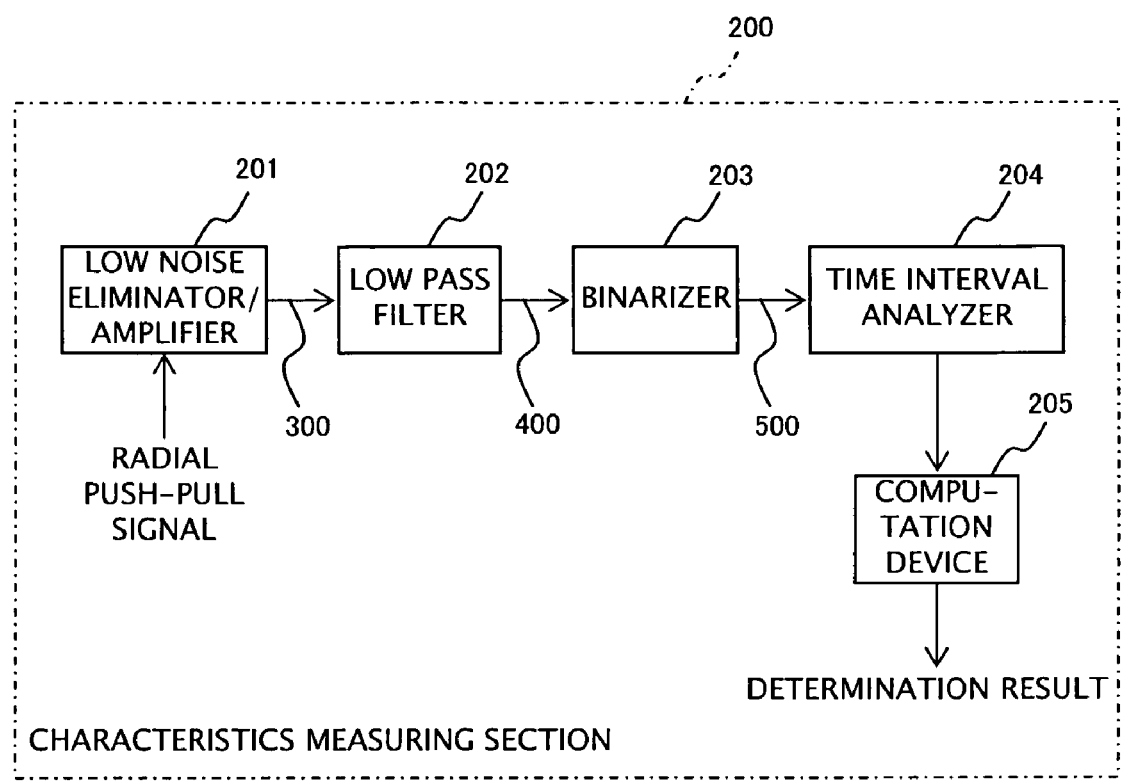
FIG. 1 is a block diagram showing a structure of a characteristics measuring section according to the embodiment of the present invention.

FIG. 1 is a block diagram showing the structure of the characteristics measuring section 200. A low noise eliminator/amplifier 201 removes a direct current component contained in the wobble signal and then appropriately amplifies the wobble signal for output to a low-pass filter 202.

The upper limit of the low-pass filter 202 is set to twice the fundamental frequency of a wobble signal so as to prevent a binary signal from being inverted at the boundary portion of BPSK modulation, and the low-pass filter 202 smoothes the steep portion of a BPSK modulated wobble signal at the phase boundary portion. The wobble signal in which the boundary portion is thus smoothed is supplied to a binarizer 203.

The binarizer binarizes (digitizes in binary data) the wobble signal supplied from the low-pass filter 202 using a predetermined binarization threshold value, and outputs the binary wobble signal to a time interval analyzer 204. The binarization threshold value is set at substantially the center of the amplitude of the wobble signal.

The time interval analyzer 204 includes a counter and a memory for sequentially storing the frequency (the number of occurrences) of a binary wobble signal counted for each period in the memory, and analyzes a period or a duration of the binary wobble signal. The period of a binary wobble signal includes a period corresponding to a half the fundamental period of a wobble signal and a period corresponding to the boundary portion of phase modulation. Consequently, the analysis result by means of the time interval analyzer includes two peak periods (i.e. two periods each having the maximum number of occurrence). Data concerning the two peak periods, more specifically the periodic value data and the duration data of each period, are measured and supplied to a computation device 205.

The computation device 205, on the basis of the analysis result from the time interval analyzer 204, computes an evaluation parameter E for evaluating the wobble tracks. Specifically, when the two peak periods are represented by T1 and T2 (T1<T2), respectively, the computation device 205 computes:

$$E = (2T1 - T2)/2T1 \times 360(°).$$

Because, theoretically, T1 corresponds to a half the fundamental period of a wobble signal and T2 corresponds to the fundamental period of a wobble signal, the relationship of 2T1=T2 is assumed to be satisfied. However, if the two phases are not shifted by precisely 180 degrees, 2T1 does not correspond to T2, resulting in a difference by an amount corresponding to the phase shift. Accordingly, E in the above equation is a parameter which indicates a phase shift (a phase error angle).

Further, the computation device 205 computes a standard deviation value of each of the peak periods T1 and T2 from the duration data supplied from the time interval analyzer 204. More specifically, the computation device 205 computes standard deviations σ1 and σ2 obtained when the distributions in the corresponding peak periods T1 and T2 are assumed to be normal distribution (Gaussian function) The standard deviations σ1 and σ2 represent spread of the period in the peak periods T1 and T2, respectively, and therefore represent noise characteristics of a signal. Accordingly, the magnitude of the standard deviations σ1 and σ2 corresponds to the magnitude of CNR in the related art, and the smaller the standard deviation σ, the greater the CNR.

The computation device 205 computes the evaluation parameter E and the standard deviations σ1, and σ2, and then compares each of these computed values with a predetermined threshold value, for determining whether or not values of the phase shift and the CNR are desired values.

Figure 2:
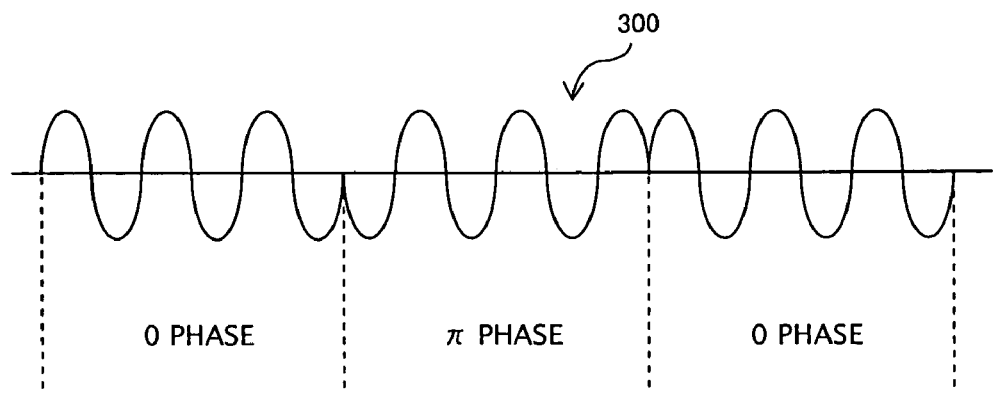
FIG. 2 is an explanatory view showing a waveform of a BPSK modulated wobble signal.

FIG. 2 shows a waveform of a wobble signal 300 which is supplied from the low noise eliminator/amplifier 201 to the low-pass filter 202. Assuming the two phases to be 0 phase and π phase, the wobble signal assumes a waveform which is phase modulated in a manner of 0 phase, π phase, 0 phase, . . . .

Figure 3:
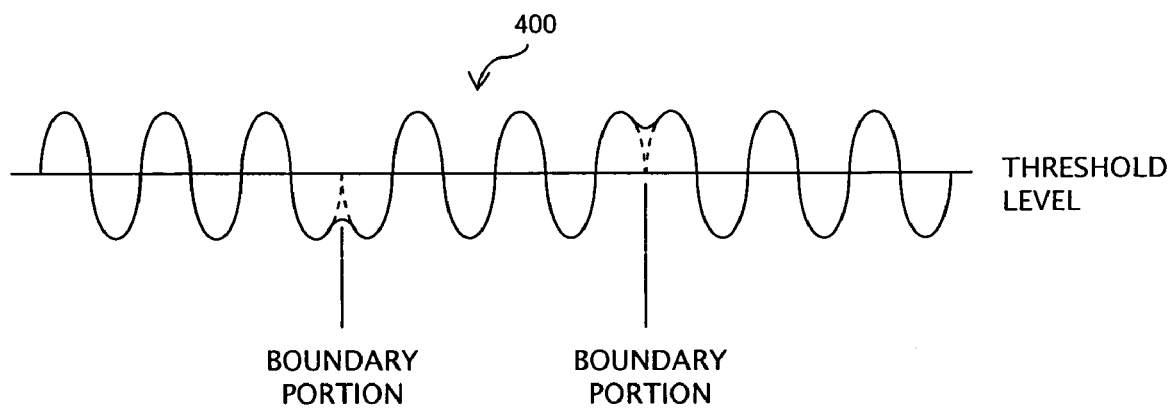
FIG. 3 is an explanatory view showing a waveform of a wobble signal after passing through the low-pass filter.

FIG. 3 shows a waveform of a wobble signal 400 in which the phase boundary portion is smoothed by the low-pass filter 202 and which is to be supplied to the binarizer 203. In FIG. 3, a dotted line represents the signal waveform prior to smoothing, and the solid line represents the signal waveform after smoothing. Here, it is also possible to smooth the shape of the wobble tracks formed on an optical disk at the phase boundary portion. This structure allows a wobble signal waveform having a smoothed phase boundary portion as shown in FIG. 3 to be obtained without providing a low-pass filter, thereby facilitating evaluation of quality of the wobble tracks.

Figure 4:
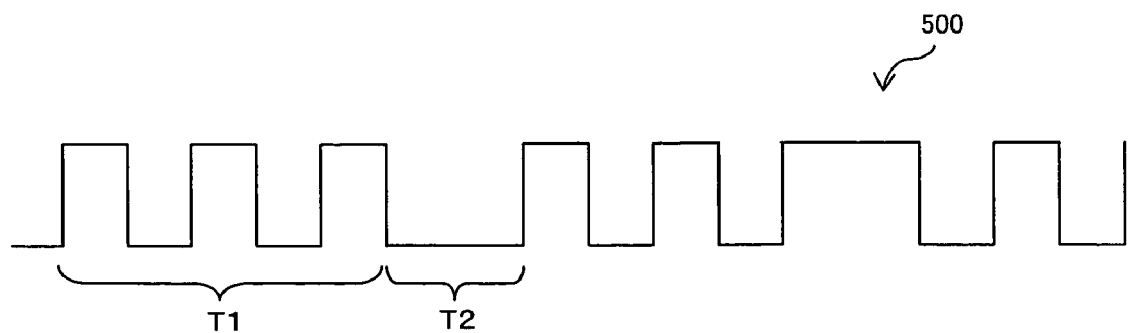
FIG. 4 is an explanatory view showing a waveform of a wobble signal after binarization.

FIG. 4 shows a waveform of a binary wobble signal 500 which is binarized by the binarizer 203 and is to be supplied to the time interval analyzer 204. As the phase boundary portion has been smoothed as shown in FIG. 3, even if a wobble signal is binarized with a threshold value at the substantially center of the amplitude of the wobble signal, the resulting binary signal is not inverted at the phase boundary portion and therefore a binary signal whose period is T2, which is the same as the fundamental period, at the phase boundary portion can be obtained. At portions other than the phase boundary portions, on the other hand, the period of the binary wobble signal is T1, which is a half of the fundamental period.

Figure 5:
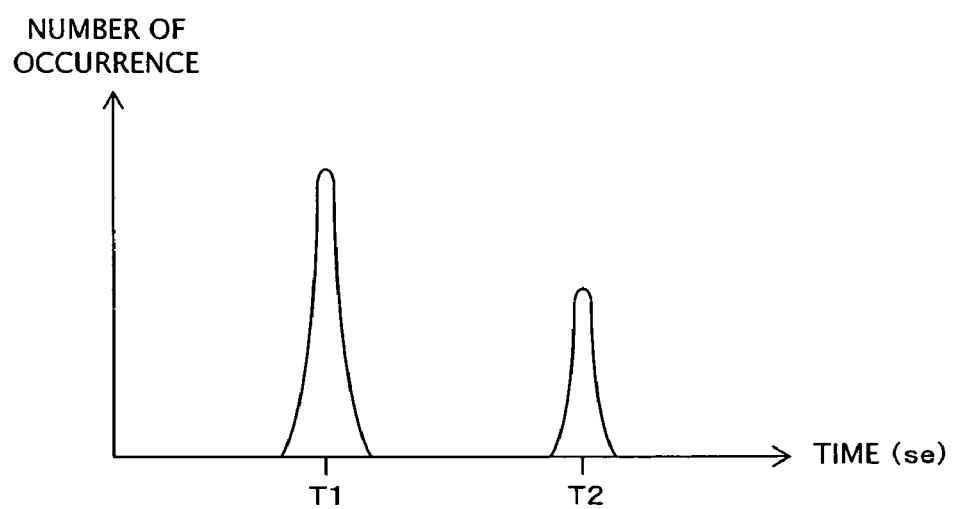
FIG. 5 is a view for explaining the analysis result of the time interval analyzer.

FIG. 5 shows the analysis result obtained by the time interval analyzer 204. In FIG. 5, the horizontal axis represents time (period) and the vertical axis represents the number of occurrences (frequency) of each period. The binary wobble signal, including a signal with the period T1 and a signal with the period T2 as described above, has two peaks at positions corresponding to these two periods, respectively. The time interval analyzer 204 measures the periods T1 and T2 of the peaks and the duration thereof and outputs the result to the computation device 205.

Figure 6:
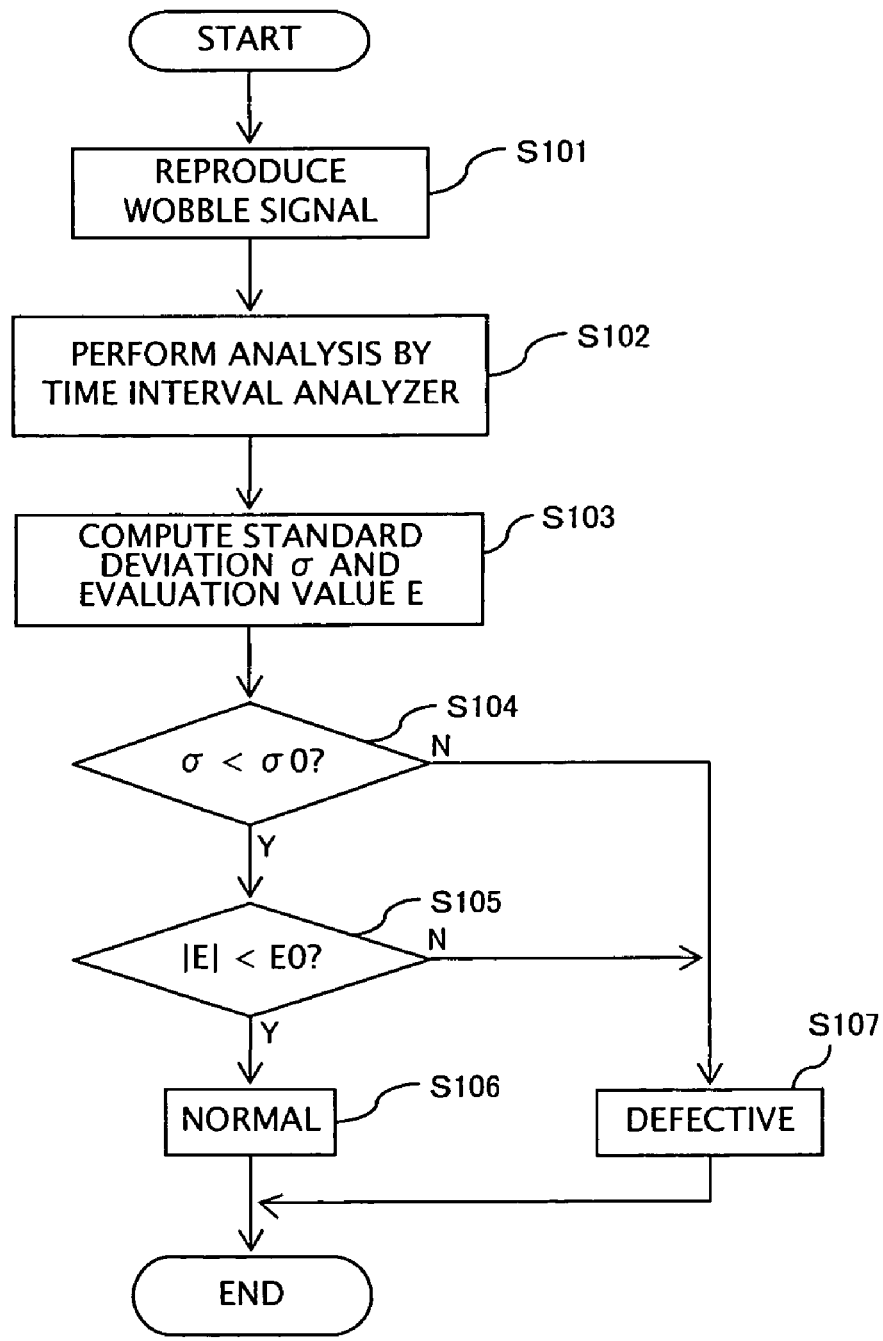
FIG. 6 is a flowchart of a process according to the present embodiment.

FIG. 6 shows a flowchart of overall processing according to the present embodiment. First, an optical disk D1 is mounted, and laser light is irradiated from the PUH 40 onto the optical disk D1. The light reflected from the optical disk D1 is received by the PD 50, and a wobble signal is reproduced as a radial push-pull signal (S101). The wobble signal is processed by the low noise eliminator/amplifier 201 and the low pass filter 202 and is then binarized by the binarizer 203, and is thereafter supplied to the time interval analyzer 204 for analysis (S102). Here, the analysis performed in the time interval analyzer 204 refers to measurement of the two peaks T1 and T2 and also of durations of these periods. Subsequently, on the basis of the analysis result, the computation device 205 computes an evaluation parameter (an evaluation value) E and each standard deviation σ1, σ2 (S103).

Figure 9:
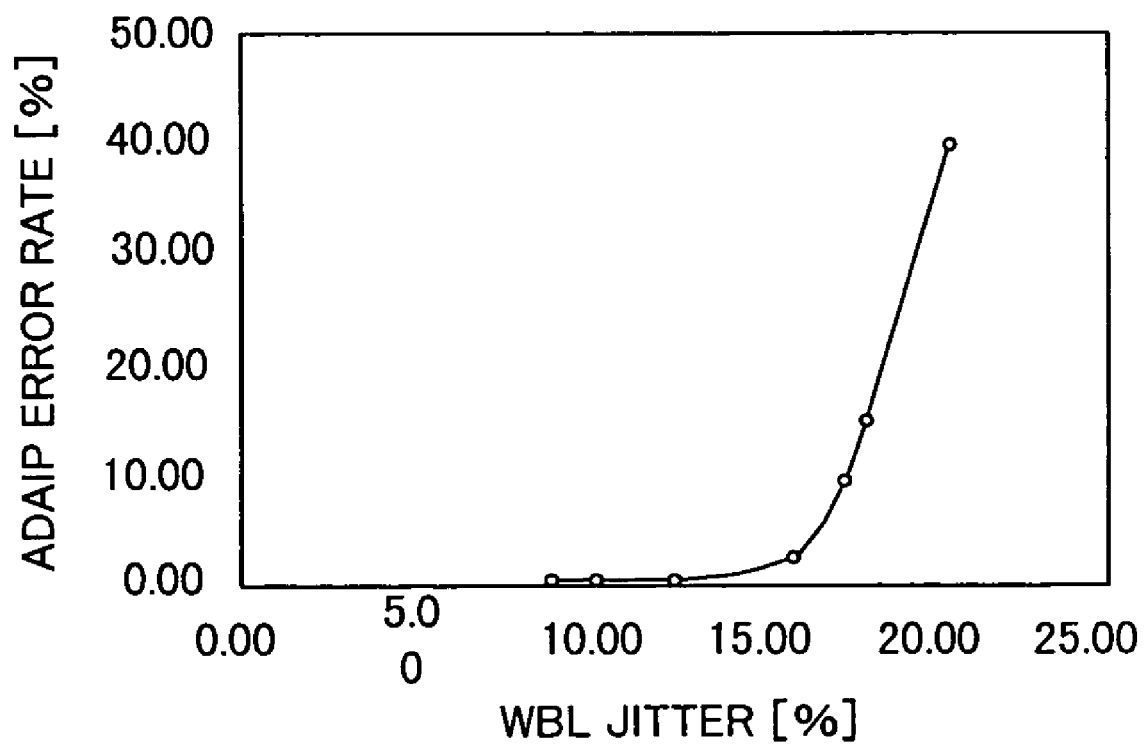
FIG. 9 is a graph showing a relationship between jitter and an error rate of a wobble signal.

After computing the evaluation parameter E and the standard deviations σ1 and σ2, the computation device 205 compares these values to predetermined threshold values stored in a memory. Specifically, the computation device 205 compares each of the standard deviations σ1 and σ2 with a threshold value σ0, to determine whether or not the value is smaller than the threshold value σ0 (S104). The threshold value σ0 is set in accordance with CNR which is required for reproducing the wobble tracks. In general, a demodulation error rate of $1.0 \times 10^{-3}$ or less is required in order to demodulate the address information from the wobble tracks which have been phase modulated, and therefore the threshold value σ0 can be set in accordance with this demodulation error rate. Here, jitter can be obtained by normalizing the standard deviation σ with the period T of the binary wobble signal. Assuming σ=61.6 nsec and T=616 nsec, for example, jitter is σ/T×100=61.6/616× 100=10(%). FIG. 9 shows a relationship between jitter and an ADIP (Address in Pregroove) error rate, in which the horizontal axis represents jitter of a wobble (WBL) signal and the vertical axis represents an error rate. As the demodulation error rate of $1.0 \times 10^{-3}$ or less is desirable, it is possible to determine, from FIG. 9, a threshold jitter with which the demodulation error rate of $1.0 \times 10^{-3}$ or less can be obtained and further set the threshold value σ0 of the standard deviation from the threshold jitter thus obtained. More specifically, as it can be understood from FIG. 9 that the error rate starts to increase rapidly at the point of jitter exceeding 15%, the demodulation error rate can be reduced sufficiently by setting the threshold value σ0 such that the jitter is at least 15% or less. Further, as the demodulation rate of $1.0 \times 10^{-3}$ or less is generally considered to be desirable so as to demodulate address information from the wobble tracks which have been phase-modulated, it is more preferable, from FIG. 9, to set the threshold value σ0 such that the jitter is 12% or less.

If the result of determination at step S104 is a σ≧σ0, namely if at least one of σ1 and σ2 is equal to or greater than the threshold value σ0, it is determined that sufficient CNR cannot be obtained. Consequently, the computation device 205 determines that the wobble tracks of the optical disk D1, are of poor quality and are therefore defective (S107). If the result of determination at step S104 is σ<σ0, on the other hand, namely if both values of σ1 and σ2 are smaller than the threshold value σ0, it is determined that sufficient CNR can be obtained, and then, the evaluation parameter E is further compared with the predetermined threshold value E0 (S105). The threshold value E0 is set in accordance with a phase shift amount allowable in the wobble tracks. Here, when the phase shift becomes 90° in phase modulation, the phase changing point cannot be detected and consequently the correct address information cannot be demodulated from the wobble tracks. It is therefore necessary to set an allowable phase shift to 90° or smaller. In this case, however, the jitter becomes worse while the phase changing point can be detected, if the allowable value is too large within this range. It is therefore necessary to reduce the allowable phase shift value at least to a value for which the jitter satisfies the above relationship. In addition, while the phase shift amount is desirably 0° under normal circumstances, an allowable value within a certain range need to be set in consideration of the manufacturing error of optical disks. In general, an allowable value is set to approximately 10% of the margin of the phase shift value. Considering the above, in the present embodiment, the threshold value E0 is set to approximately 10°. As a result of determination at step S105, if |E|≧E0 is found, namely if the phase shift amount exceeds the threshold value, which means that the phase shift amount is equal to or greater than the allowable value, it is determined that the wobble tracks of the optical disk D1 are of poor quality and are therefore defective (S107). On the other hand, if the result of determination at step S105 is |E|≧E0, the phase shift amount is also determined to be within an allowable range, and consequently it is determined that the wobble tracks of the optical disk D1 are formed correctly (S106). The determination result is indicated on a display connected to the characteristics measuring section 200, for example.

As described above, according to the present embodiment, the binary wobble signal is subjected to time analysis using the time interval analyzer 205, and the analysis result is used to compute and evaluate the evaluation parameter E and the standard deviations σ, whereby both CNR and the phase shift of the wobble tracks formed in the optical disk D1 can be evaluated. Consequently, evaluation can be performed with higher precision than the conventional evaluation apparatuses which use a spectrum analyzer for evaluating CNR of a wobble signal. Optical disks which are determined to be normal as a result of evaluation can obtain address information for performing data reproduction and data recording more reliably than conventional disks. In particular, optical disks in which wobble tracks are formed with high precision and the shape of phase boundary portions of the wobbles are smoothed assume that the evaluation parameter E and the standard deviations σ both satisfy required conditions, and are therefore considered to be optical disks suitable for data recording and reproduction.

Further, in the present embodiment, all or a portion of the characteristics measuring section 200 can be formed by a computer. The processing shown in FIG. 6 can be implemented by installing a program in the computer and causing a processor of the computer to sequentially execute the program. For example, the time interval analyzer 204 and the computation device 205 are formed by a computer, and the binary wobble signal is supplied from the binarizer 203 to an input terminal of the computer. The processor of the computer counts the period of the input binary wobble signal based on the process program, and sequentially stores a count value for each period in a memory. After counting the periods for a plurality of tracks of the optical disk D1, the two peak periods T1 and T2 are extracted to compute the evaluation parameter E, and the computed evaluation parameter E is stored in the memory. Further, the standard deviations σ1 and σ2 of the two peak periods are computed with the distribution of the two peak periods taken as a normal distribution, and the computed standard deviations σ1 and σ2 are stored in the memory. On the other hand, the threshold value σ0 of the standard deviation and the threshold value E0 of the evaluation parameter are prestored in the memory. The processor compares the computed standard deviations σ1 and σ2 with the threshold value σ0 and also compares the evaluation parameter E with the threshold value E0. If either the standard deviation or the evaluation parameter is equal to or greater than the threshold values, the wobble tracks of the optical disk D1 are determined to be defective, whereas if both the standard deviation and the evaluation parameter are smaller than the threshold values, the wobble tracks are determined to be normal. The processor indicates the determination result on the display of the computer. In this case, in addition to the determination result of "normal" or "defective", the computation values of the standard deviations and the evaluation parameter by themselves may be displayed with their threshold values. If the standard deviation is smaller than the threshold while the evaluation parameter is equal to or greater than the threshold value, the display may indicate that CNR is normal while the phase shift amount is abnormal. The program may be stored in a portable medium such as CD-ROM and DVD-ROM or the like and may be installed in the computer from the medium. If the computer is connected to the network, the program may be installed in the computer from a host computer via the network.

Further, while in the present embodiment, the evaluation parameter $E=(2T1-T2)/2T1\times360(°)$ is used, any other parameter may be used as long as it is an amount for evaluating a difference between 2T1 and T2. For example, $E1=|2T1-T2|$ or $E2=T1-T2/2$ may be used. Alternatively, a difference between 2T1 and T2 may be evaluated indirectly using $E3=T1-T2$.

Also, while in the present embodiment a standard deviation is used as a parameter for evaluating CNR, a variance may be used. When a variance is used, a threshold value is set in accordance with the variance.

Moreover, while in the present embodiment the standard deviations σ1 and σ2 of the two peak periods T1 and T2, respectively are compared with the threshold value σ0, only one of σ1 and σ2 may be computed and compared with the threshold value σ0. Also, different threshold values σ0 may be used for σ1 and σ2. Further, while in the present embodiment the standard deviation σ is compared with the threshold value σ0, a jitter obtained from the standard deviation may be compared with a jitter threshold value. When the evaluation parameter E and the jitter J are used for evaluating an optical disk, the optical disk is determined to be normal when both $-10°\leq E\leq 10°$ and $J\leq 15\%$ are satisfied, as described above. In an example normal optical disk according to the present embodiment, the shape of the phase boundary portion of the wobble tracks is smoothed, and the wobble tracks satisfy the conditions of $-10°\leq E\leq 10°$ and $J\leq 15\%$.

Further, while in the present embodiment an optical disk inspection apparatus has been illustrated, a partial structure of the optical disk inspection apparatus, more specifically the low-pass filter 202 which removes a high frequency component at the phase boundary of a reproduced wobble signal and the binarizer 203 which binarizes an output from the low-pass filter 202, which are shown in FIG. 1, may be incorporated into an optical disk apparatus which performs data recording and reproducing with respect to an optical disk. By eliminating a high frequency component at the phase boundary of a reproduced wobble signal using the low-pass filter 202 or smoothing the shape of phase boundary portion of the wobble track of the optical disk to thereby smooth the phase boundary portion of the reproduced wobble signal, it is possible to achieve the advantage that the phase detection margin at the phase changing portion is improved to thereby enhance the phase detection performance, whereby the wobble detection performance can be improved to further enhance the address reading performance. Also, as the phase margin is increased with the optical disk being in a unrecorded state, deterioration caused by recording can be reduced, which results in the advantages that a resistance to deterioration of a wobble signal due to recording can be increased, and address reading degradation during and after recording can be suppressed to thereby enhance the stability of a recording operation. In addition, as the phase boundary portion of the reproduced wobble signal is smoothed, influences on a recorded signal can be reduced (i.e. local influence of the wobbles on data can be reduced).

While the preferred embodiment of the present invention has been described using specific terms, such description is for illustrative purposes only, and it is to be understood that changes and variations may be made without departing from the spirit or scope of the appended claims.

What is claimed is:

1. An inspection apparatus for an optical disk having a wobble track wobbled in accordance with a frequency which is phase modulated with two phases, the inspection apparatus comprising:

a binarizer for binarizing a wobble signal corresponding to the wobble track;

a time interval analyzer for analyzing a period included in a binary wobble signal;

a computation device which extracts a first peak period T1 and a second peak period T2 (T1>T2) from an analysis result obtained by the time interval analyzer for computing a difference value between twice the first peak period T1 and the second peak period T2 and computing peak widths of the first peak period T1 and the second peak period T2; and an evaluation device for evaluating a quality of the wobble track in accordance with the difference value and the peak widths.

2. An inspection apparatus according to claim 1, further comprising:
a low pass filter for eliminating a high frequency component of the wobble signal at a phase boundary portion and output a resulting wobble signal to the binarizer.

3. An inspection apparatus according to claim 1, wherein the computation device computes an evaluation parameter E=(2T1−T2)/2T1 and also calculates, as the peak width, a standard deviation obtained when taking distributions of the first peak period and the second peak period as a normal distribution, and
the evaluation device compares the evaluation parameter E and the standard deviation with respective threshold values for evaluation.

4. A method of inspecting an optical disk having a wobble track wobbled in accordance with a frequency which is phase modulated with two phases which are shifted from each other by 180 degrees, the method comprising the steps of:
irradiating a light beam to the wobble track and reproducing a wobble signal corresponding to the wobble track from light reflected from the wobble track;
eliminating, using a low pass filter, a high frequency component existing at a boundary portion of the phase modulation, from the wobble signal which is reproduced;
binarizing the wobble signal which has passed through the low pass filter;
analyzing a period included in a binary wobble signal using a time interval analyzer;
extracting two peak periods from an analysis result obtained by the time interval analyzer and computing a shift amount of the two peak periods from a predetermined relationship and peak widths of the two peak periods; and
comparing the shift amount with a first threshold value for evaluating a phase shift of the wobble track and comparing the peak widths with a second threshold value for evaluating CNR of the wobble signal.

5. A computer-readable medium including computer-executable instructions for inspecting an optical disk having a wobble track wobbled in accordance with a frequency which is phase modulated with two phases which are shifted from each other by 180 degrees, wherein the instructions, when loaded to a computer, cause the computer to execute the steps of:
when a binary wobble signal obtained by binarizing a wobble signal corresponding to the wobble track is input, counting the number of each period included in the binary wobble signal and storing the counted value in a memory for performing analysis;
extracting two peak periods of high frequency from an analysis result and computing a shift amount of the two peak periods from a predetermined relationship and peak widths of the two peak periods using a processor;
comparing the shift amount with a first threshold value stored in a memory and comparing the peak widths with a second threshold value stored in the memory for determining whether or not the optical disk is normal using the processor; and
displaying a determination result on a display device.

6. An optical disk, comprising:
a wobble track wobbled in accordance with a frequency which is phase modulated with two phases which are shifted from each other by 180 degrees,
wherein the wobble track is formed such that a phase shift amount E obtained by a computation expression of (2T1−T2)/2T1×360° from a first peak period T1 and a second peak period T2 (T1>T2) included in a binary wobble signal which is obtained by binarizing a reproduced wobble signal and a jitter J obtained from a standard deviation when a distribution of the first peak period or the second peak period is taken as a normal distribution satisfy at least one of −10°≦E≦10 and J≦15%.

7. An optical disk according to claim 6,
wherein the wobble track is formed in such a manner that a shape of a phase boundary portion thereof is smoothed.

8. An optical disk comprising:
a wobble track wobbled in accordance with a frequency which is phase modulated with two phases which are shifted from each other by 180 degrees,
wherein
the wobble track is formed in such a manner that a shape of a phase boundary portion is smoothed,
a phase shift amount E obtained by a computation expression of (2T1−T2)/2T1×360° from a first peak period T1 and a second peak period T2 (T1>T2) included in a binary wobble signal which is obtained by binarizing a reproduced wobble signal satisfies −10°≦E≦10, and
a jitter J obtained from a standard deviation when a distribution of the first peak period or the second peak period is taken as a normal distribution satisfies J≦15%.

* * * * *

UNITED STATES PATENT AND TRADEMARK OFFICE
CERTIFICATE OF CORRECTION

PATENT NO. : 7,697,405 B2
APPLICATION NO. : 11/259852
DATED : April 13, 2010
INVENTOR(S) : Akira Mashimo et al.

It is certified that error appears in the above-identified patent and that said Letters Patent is hereby corrected as shown below:

Column 8, Line 59
"and a second peak period T2 (T1>T2) from an analysis" should read, --and a second peak period T2 (T1<T2) from an analysis--.

Column 10, Line 21
"second peak period T2 (T1>T2) included in a binary" should read, --second peak period T2 (T1<T2) included in a binary--.

Column 10, Line 40
"and a second peak period T2 (T1>T2) included in a" should read, --and a second peak period T2 (T1<T2) included in a--.

Signed and Sealed this

Thirtieth Day of November, 2010

David J. Kappos
*Director of the United States Patent and Trademark Office*